United States Patent [19]

Spiessbach et al.

[11] 3,919,471

[45] Nov. 11, 1975

[54] TV SIGNAL CORRECTION CIRCUITRY

[75] Inventors: Andrew J. Spiessbach, Eugene, Oreg.; William F. Parrish, Baltimore, Md.; Paul G. Kennedy, Monroeville, Pa.

[73] Assignee: Westinghouse Electric Corporation, Pittsburgh, Pa.

[22] Filed: May 31, 1974

[21] Appl. No.: 475,232

[52] U.S. Cl. ..... 178/7.1; 178/DIG. 34; 178/DIG. 39

[51] Int. Cl.[2] ........................................... H04N 5/14

[58] Field of Search ............... 178/DIG. 34, 7.1, 7.2, 178/DIG. 39, DIG. 1

[56] References Cited

UNITED STATES PATENTS 3,780,215 12/1973 Shibata et al. .................... 178/5.4 R

FOREIGN PATENTS OR APPLICATIONS 2,048,851 5/1971 Germany ..................... 178/DIG. 25

*Primary Examiner*—Robert L. Richardson

*Attorney, Agent, or Firm*—D. Schron

[57] ABSTRACT

TV camera signals to be presented on a TV monitor are processed to remove undesirable shading components. The circuitry is adaptive in that for each input video signal a low frequency component is extracted to obtain a corrective waveform which is subtracted from that input signal or a subsequent input signal to reduce or eliminate the shading component. Further correction may also be made by utilizing the corrective waveform to govern the amplification of the video signal to be displayed.

12 Claims, 6 Drawing Figures

TV SIGNAL CORRECTION CIRCUITRY

BACKGROUND OF THE INVENTION

1. Field of the Invention

The invention generally relates to circuitry for correcting TV signals having shading components which result in unsatisfactory TV monitor displays.

2. Description of the Prior Art

When a TV camera is used to examine a field of view, the camera provides video signals representative of the scene being viewed. Additionally, however, there are variations in the voltage level of the video signal which are completely uncorrelated with the useful scene information and are objectionable in that the useful or wanted picture information displayed seems to be obscured by a mask. These scene unrelated variations are known as shading patterns, or components, and are a result of various factors such as non-uniform scene illumination and non-uniform sensor and optics response associated with the TV camera.

In general, variations due to camera and optic characteristics for a particular camera are known and accordingly, prior art systems include waveform generating circuitry to reduce or eliminate these variations.

Under controlled studio lighting conditions signal variations due to uneven illumination are minimized or can be corrected by the same method. In the field however and particularly in underwater viewing, non-uniform scene illumination due to various uncontrolled factors still produce an undesirable shading component in the video signal. When viewing the field of view on a TV monitor, a typical picture will appear with maximum darkening at the edges which decreases uniformly from corner to center. The display monitor controls may be adjusted to give a normal picture over the central portion of the screen however the edges appear too dark. Readjustment of the controls to reveal edge information will wash out the central portion of the display so that less than the entire TV picture is meaningfully displayed.

In another correction method two cameras are utilized one being a conventional camera whose video signal contains high and low frequency components S, in addition to a low frequency spurious component, *d*. The other camera focused on the same scene as the first, provides only a low frequency signal, $S_{LF}$. The output of the first camera is filtered to obtain low frequency components $S_{LF} + d$ which is subtracted from the second camera's output $S_{LF}$, to yield *d*. This component d is thereafter subtracted from the first camera's output $S+d$ to yield S. It is seen however that this final signal S which is to be displayed still contains the objectional low frequency component.

SUMMARY OF THE INVENTION

The present invention allows for a better picture portrayal on a TV monitor than prior art systems and accomplishes this by reducing the undesirable shading component of the video signal on an adaptive basis. That is, a corrective waveform which is utilized is derived directly from the video signal itself as opposed to other corrective circuitry which generates predetermined waveforms for correction.

The waveform correction circuitry of the present invention receives input video signals each of which is subject to inclusion of an undesirable shading component. The shading component is a low frequency signal and this low frequency component is extracted from the video signal and thereafter subtracted from it. To further improve the contrast of display edge information, a further correction to the input video signal is accomplished with the provision of a variable gain amplifier which receives the processed video and amplifies it by a variable amplification factor governed by the corrective waveform.

DESCRIPTION OF THE PREFERRED EMBODIMENT

Figure 1:
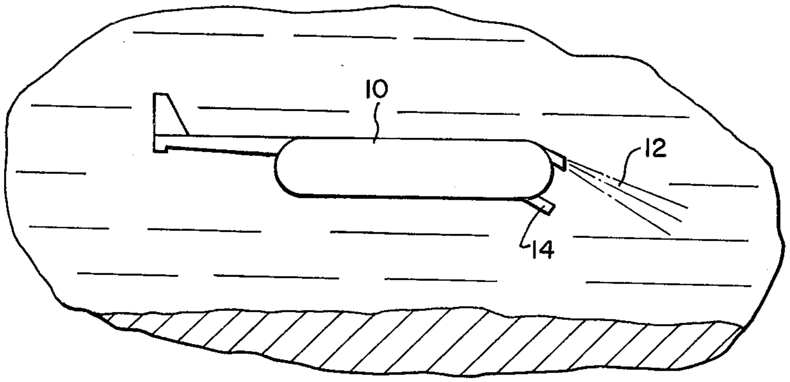
FIG. 1 illustrates an underwater environment which results in poor television pictures.

Although the present invention finds applicability in a variety of environments, it is particularly well adapted for underwater viewing such as illustrated in FIG. 1. An underwater carrier 10 illuminates an area by means of light beam 12 and the area is viewed by means of TV camera 14 on or in the carrier 10. The typical video signal as would be provided by the camera 14 is made up of different components and an example of one line of video signal is illustrated in waveforms A through E of FIG. 2. The video signal includes a voltage variation due to scene information and this is illustrated by waveform A of FIG. 2. Waveform B represents the synchronizing and blanking pulses associated with a video signal. Waveform C is illustrative of a type of undesirable shading component due to non-uniform scene illumination back scatter, etc. whereas waveforms D and E are undesirable shading components which may be associated with the particular camera and camera optics construction.

Figure 2:
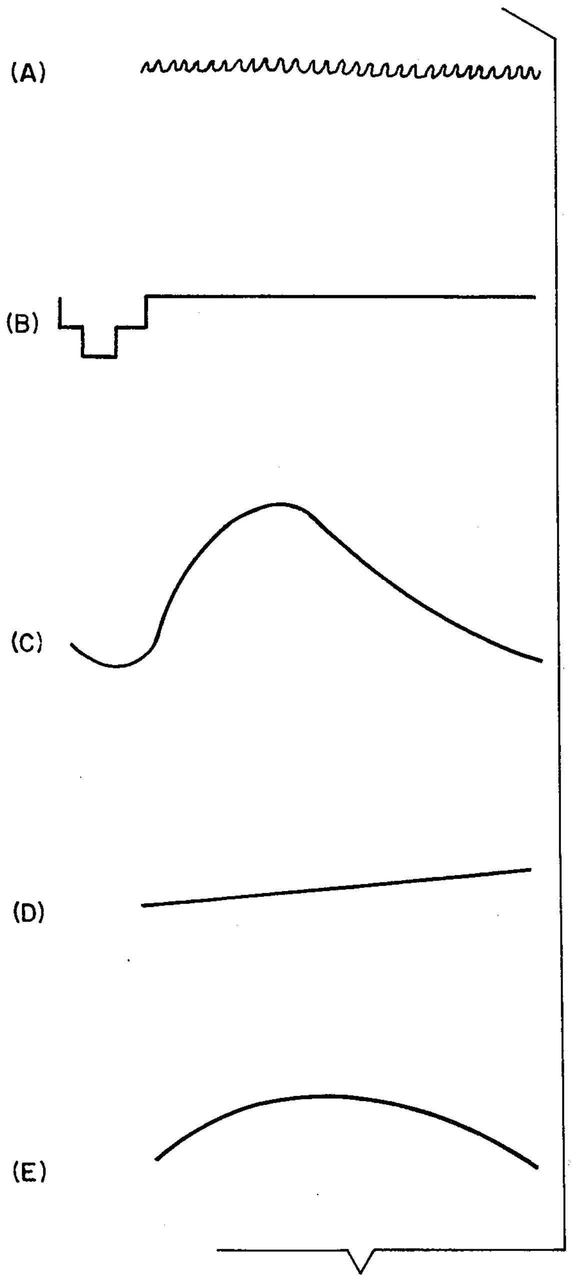
FIG. 2 shows waveforms illustrating typical components of one TV line video signal.
Figure 3:
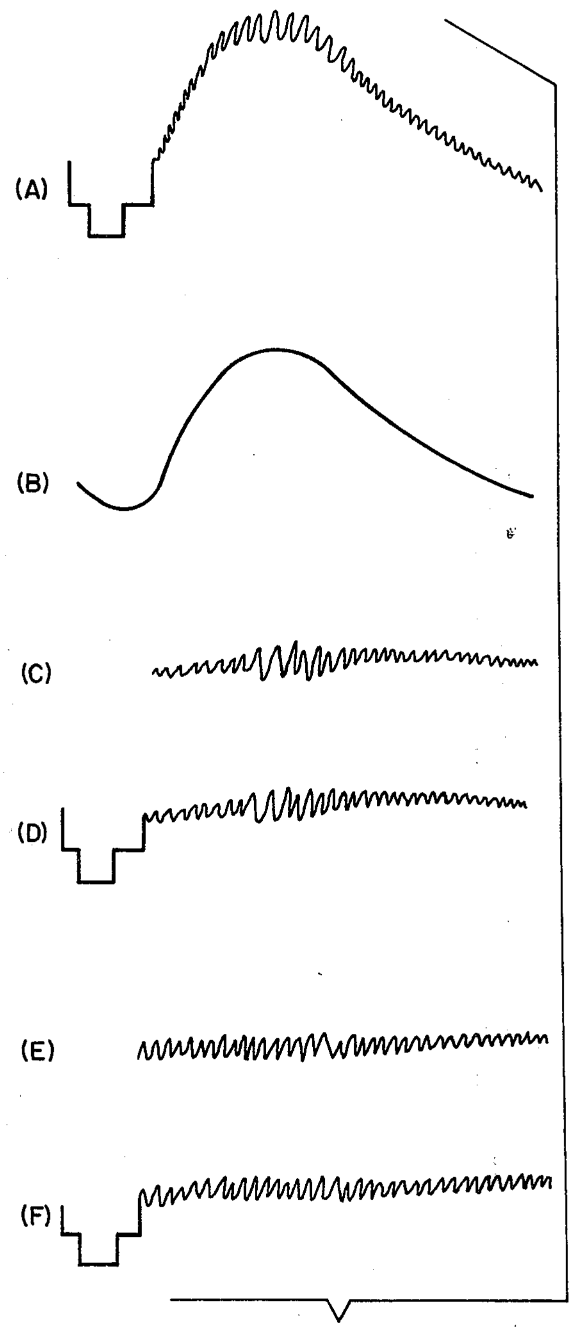
FIG. 3 shows waveforms to aid an understanding of the present invention.
Figure 4:
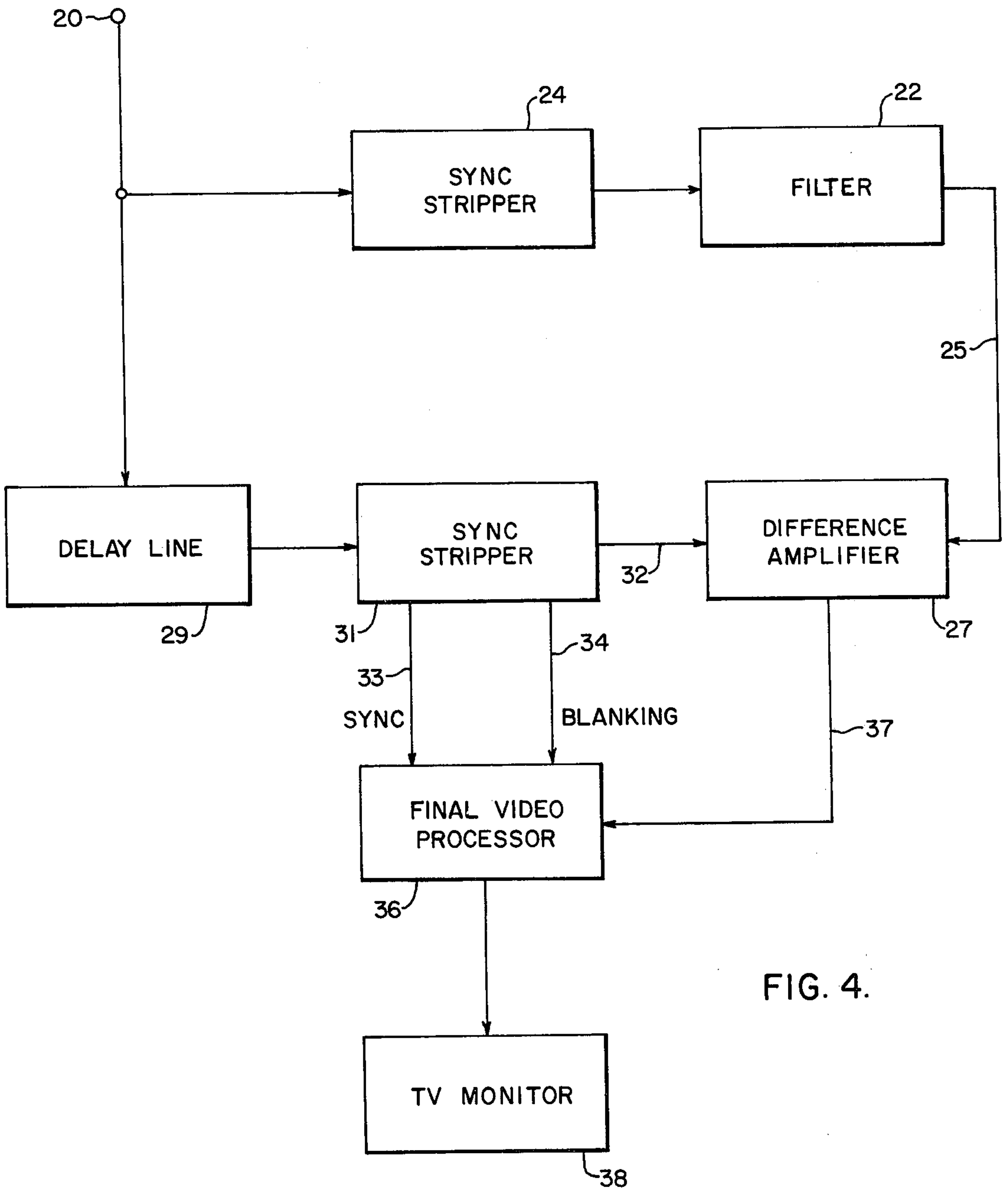
FIG. 4 is one embodiment of the invention for obtaining a first order correction.

Let it be assumed that the camera 14 is a conventional camera having conventional circuitry for eliminating the effects of the shading represented by waveforms D and E such that the camera's output signal is a composite video signal of waveforms A, B and C, of FIG. 2, the composite being illustrated as the video signal A of FIG. 3. FIG. 4 illustrates an embodiment of the present invention for reducing the effects of the shading component and includes an input 20 for receiving the input video signal as illustrated by waveform A of FIG. 3. The circuitry operates on the assumption that all low frequency video is undesirable shading and all high frequency video is useful scene information and accordingly circuit means are provided for extracting the low frequency component of the video input for deriving a corrective waveform. To accomplish the low frequency extraction there is provided a filter 22 which is a low pass filter having a cutoff frequency for example of 40 kilohertz.

Since the input video signal includes synchronizing and blanking pulses which have frequency components occurring within the pass band of the filter 22, there is provided a sync stripper circuit 24 for removing the synchronizing and blanking signals of the input video signal so that undesired variations in the corrective waveform are prevented. The output of the filter 22 on line 25 therefore is the low frequency component of the input video signal caused by uncontrolled factors such as non-uniform illumination. The filter output waveform, illustrated as waveform B of FIG. 3, is the corrective waveform which is provided to additional circuitry for applying to the input video signal so as to reduce the shading component thereof. This additional circuitry includes the means for performing a subtractive correction. To this end there is provided a difference amplifier 27 for subtracting the corrective waveform from the original input video signal. The input video signal arrives at the difference amplifier 27 at the same time as the corrective waveform from the filter 22, by the inclusion of a delay line 29 having a time delay identical to the delay the filter imposes. The delay line 29 is followed by a second sync stripper 31 which provides on line 32 a stripped uncorrected video signal, in proper time sequence with the corrective waveform, to the difference amplifier 27.

The sync stripper 31 also provides on outputs 33 and 34, synchronizing and blanking pulses to a final video processor 36.

One input to difference amplifier 27 is a signal, on line 32, consisting of information plus a shading component. The other input to difference amplifier 27 is the corrective waveform, on line 25, which is a replica of the shading component and the subtraction process in the difference amplifier 27 yields, on line 37, a video signal, waveform C of FIG. 3, in which the undesirable component has been substantially reduced. In order to provide for a proper signal for display on TV monitor 38, synchronizing and blanking pulses are combined with the output of difference amplifier 27 in the final video processor yielding a corrected display signal as illustrated by waveform D of FIG. 3.

The foregoing represents the signal processing for one TV display line and the process in continuous with subsequent TV display lines applied to input 20, with proper correction taking place regardless of the variation of shading from input signal to input signal.

The processing by the circuitry of FIG. 4 is a subtractive correction which results in a much improved display over prior art systems. With subtractive correction alone, however, there may be instances where the information at the edge portions of the display remains at somewhat lower contrast levels compared to the central portions of the display. The varying dynamic range of the signal can be compensated by a multiplicative correction to yield a picture having a more nearly uniform contrast across the entire display.

Figure 5:
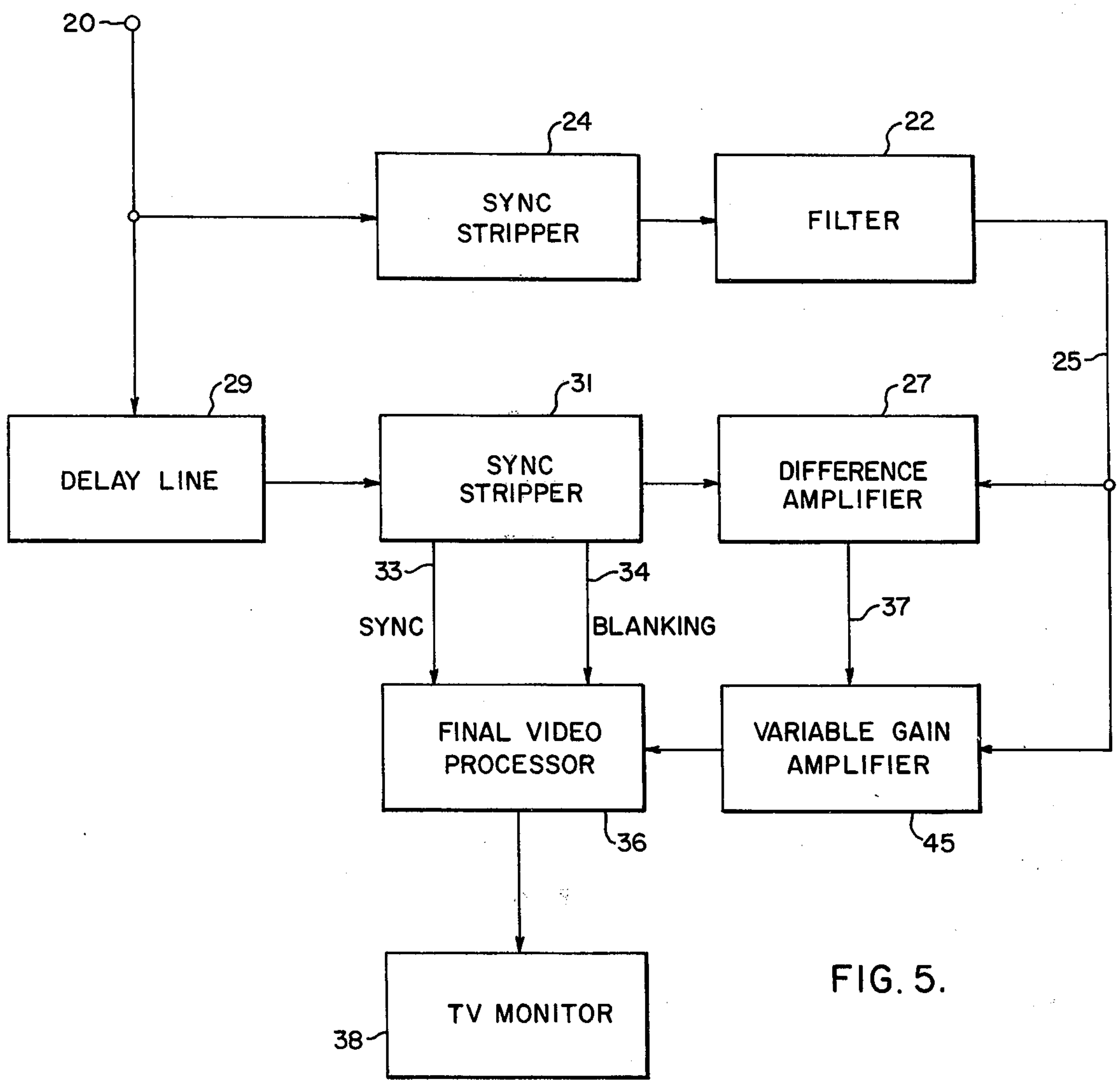
FIG. 5 illustrates an embodiment of the present invention which additionally provides for a second order correction.

This multiplicative correction may be accomplished by the circuitry of FIG. 5 which is similar to FIG. 4, and has similar reference numbers, however with the addition of an amplifier 45 of the type whose gain is variable in accordance with an input control signal. The input control signal to the variable gain amplifier 45 is the corrective waveform on line 25 from the filter 22. The input signal to be amplified by the variable gain amplifier 45 is the output signal on line 37 from the difference amplifier 27 and having the first order correction previously described. The variable gain amplifier control is such that its gain is, for example, inversely proportional to the voltage level of the control signal. With reference to the waveforms of FIG. 3, it is seen that the control signal, waveform B, starts out at a relatively low value which increases to a maximum and thereafter slopes off again to a relatively low value. The effect of this on the amplification of waveform C is to increase its amplitude near the beginning and end of the waveform, more so than nearer the middle, as illustrated by waveform E which is the output of variable gain amplifier 45. As before, synchronizing and blanking pulses are combined with this waveform in the final video processor 36, yielding waveform F now having subtractive and multiplicative corrections for presentation to the TV monitor 38.

The delay line 29 illustrated in FIGS. 4 and 5 receives the input video signal and delays it by a predetermined time delay. The delay line accordingly must be of the type which can accommodate a full video bandwidth and as such is a relatively expensive item, for current state of the art. An arrangement which significantly reduces the cost of the delay line by an order of magnitude or more is illustrated in FIG. 6.

Figure 6:
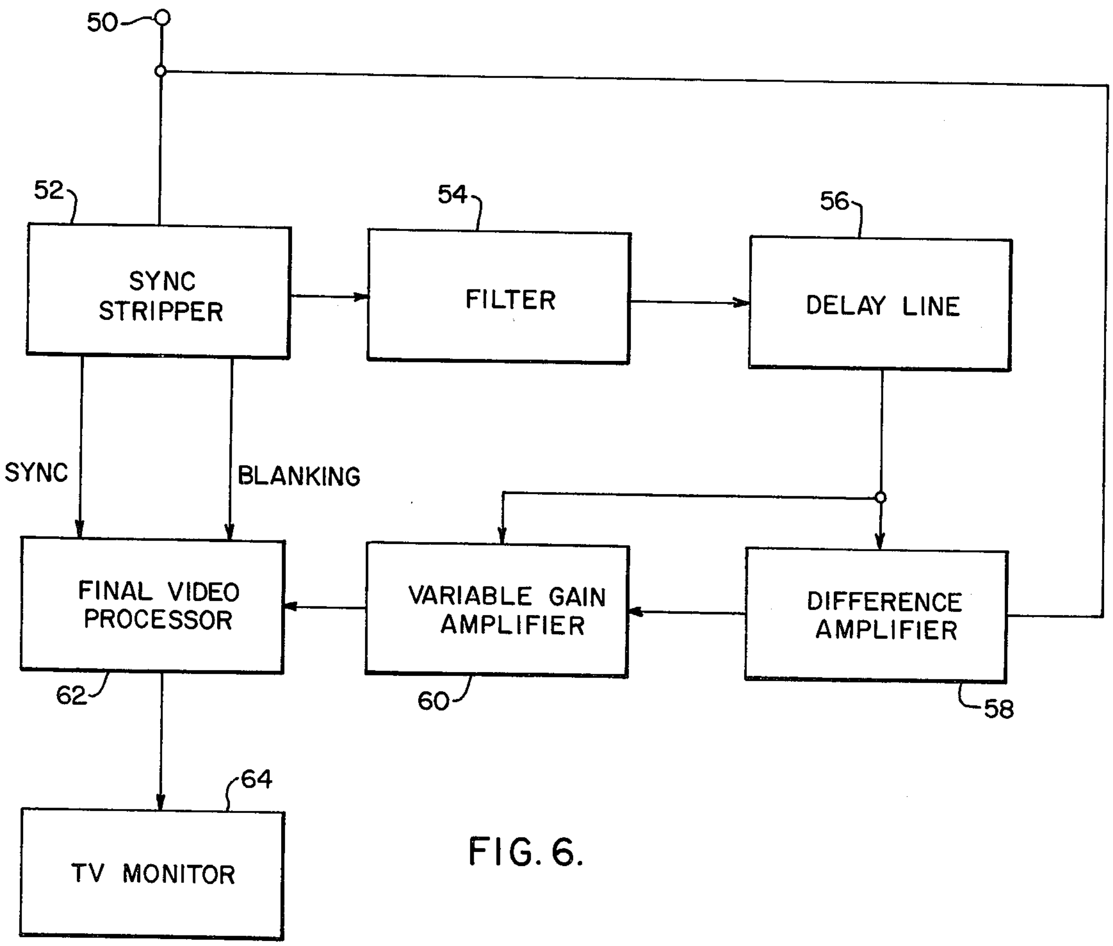
FIG. 6 illustrates another and less expensive version of the invention.

In the arrangement of FIG. 6 the video signal is applied at input 50 and after removal of synchronizing and blanking pulses by sync stripper 52 the video signal is filtered by filter 54 to obtain a corrective waveform, as waveform B of FIG. 3. Since the corrective waveform is of relatively low frequency, the delay line 56 need not be of the type which accommodates the full video bandwidth. The delay provided by the delay line 56 is adjusted so as to provide the corrective waveform to difference amplifier 58 one horizontal TV line later than the input from which it was derived. Thus, difference amplifier 58 connected to input 50 receives and subtracts an input video signal and the corrective waveform from the previous video signal. For any shading pattern encountered in actual TV systems, adjacent TV lines (e.g. 63.5 microsecond separation) will possess essentially indistinguishable shading variations such that the output of difference amplifier 58 will, to a good approximation, be the same as that with respect fo FIGS. 4 and 5, the waveform being illustrated as waveform C at FIG. 3.

The output of difference amplifier 58 as before, may be provided to a variable gain amplifier 60, the gain of which is controlled by the corrective waveform from delay line 56, as explained with respect to FIG. 5. The variable gain amplifier output illustrated by waveform E at FIG. 3 is provided to the final video processor 62 which receives the synchronizing and blanking pulses from sync stripper 52 and the signals are combined as before resulting in a signal as illustrated by waveform F of FIG. 3, for displaying on a TV monitor 64.

Accordingly, there has been described apparatus which provides automatic and adaptive shading compensation that substantially corrects for the effects of non-uniform sensor response off axis optical variations, and uneven scene illumination. The various embodiments were described with respect to one type of undesirable shading component illustrated by waveform C of FIG. 2, however the adaptive nature and operation of the apparatus is such that it will also accommodate for predictable shading components as illustrated by waveforms D and E of FIG. 2. The apparatus is applicable to any TV system and is particularly useful in underwater applications where uneven scene illumination is usually prevalent.

We claim:

1. Waveform correction circuitry comprising
A. input means for receiving input video signals each subject to inclusion of an undesirable shading component;
B. first circuit means for extracting any low frequency components of said video signals for deriving corrective waveforms;
C. second circuit means for applying said corrective waveforms to said video signals for reducing said shading component; and
D. circuit means for removing the synchronizing and blanking pulses from said video signal prior to filtering.

2. Apparatus according to claim 1 wherein
A. said corrective waveforms are respectively applied to the same video signals from which they were respectively extracted.

3. Apparatus according to claim 1 wherein said second circuit means includes
A. means for subtracting a corrective waveform from the video signal from which it was derived, to provide a corrected output signal.

4. Apparatus according to claim 1 wherein
A. said first circuit means includes a low pass filter for passing only the low frequency components of said video signal.

5. Apparatus according to claim 1 wherein said second circuit means includes
A. delay means connected to said input means for providing a delayed video signal,
B. circuit means for removing the synchronizing and blanking pulses from said delayed video signal for providing a stripped video signal,
C. a difference amplifier connected to receive a corrective waveform and said stripped video signal, from which it was derived, to provide a corrected output signal,
D. processor means for combining said corrected output signal and the removed synchronizing and blanking pulses for providing a video signal for display.

6. Waveform correction circuitry comprising
A. input means for receiving input video signals each subject to inclusion of an undesirable shading component;
B. first circuit means for extracting any low frequency components of said video signals for deriving corrective waveforms;
C. second circuit means for applying said corrective waveforms to said video signals for reducing said shading component;
D. said corrective waveforms being respectively applied to respective subsequent video signals.

7. Apparatus according to claim 6 wherein
A. each said corrective waveform is applied to a next subsequent video signal.

8. Waveform correction circuitry comprising
A. input means for receiving input video signals each subject to inclusion of an undesirable shading component;
B. first circuit means for extracting any low frequency components of said video signals for deriving corrective waveforms;
C. second circuit means for applying said corrective waveforms to said video signals fro reducing said shading component, and including
i. means for subtracting a corrective waveform from a next subsequent video signal, to provide a corrected output signal.

9. Apparatus according to claim 8 which additionally includes
A. means for amplifying said corrected output signal as a function of said corrective waveform.

10. Waveform correction circuitry comprising
A. input means for receiving input video signals each subject to inclusion of an undesirable shading component;
B. first circuit means for extracting any low frequency components of said video signals for deriving corrective waveforms;
C. second circuit means for applying said corrective waveforms to said video signals for reducing said shading component and including,
i. means for subtracting a corrective waveform from the video signal from which it was derived, to provide a corrected output signal; and
ii. means for amplifying said corrected output signal as a function of said corrective waveform.

11. Waveform correction circuitry comprising
A. input means for receiving input video signals each subject to inclusion of an undesirable shading component;
B. first circuit means for extracting any low frequency components of said video signals for deriving corrective waveforms, and including
i. means for removing the synchronizing and blanking pulses from an input video signal to provide a stripped video signal,
ii. filter means for passing only the low frequency components of said stripped video signal,
iii. delay means for delaying said filtered signal; and
C. second circuit means for applying said corrective waveforms to said video signals for reducing said shading component, and including
i. a difference amplifier connected to receive an input video signal and the output of said delay means for providing a resultant corrected signal,
ii. means for processing said corrected signal to provide a video signal for display.

12. Apparatus according to claim 11 wherein
A. the time delay imposed by said delay means is one TV line time.

* * * * *